Patented Feb. 20, 1940

2,191,060

UNITED STATES PATENT OFFICE 2,191,060

CARBONACEOUS ZEOLITE AND THE PREPARATION THEREOF

Otto Liebknecht, Berlin, Germany, assignor to The Permutit Company, New York, N. Y., a corporation of Delaware No Drawing. Original application March 8, 1935, Serial No. 10,127. Divided and this application March 24, 1939, Serial No. 264,036. In Germany April 13, 1934

11 Claims. (Cl. 252—2)

This application is a division of my copending application Serial Number 10,127, filed March 8, 1935.

It has been found that conversion products are obtainable by the action of sulphuric acid on carbonaceous substances such as, for example, wood, commercial lignite, peat, cork, charcoal, coals, cokes and similar materials, or other organic substances, which conversion products may be used for numerous purposes, particularly in the treatment of water containing salts to exchange hydrogen or sodium ions for the cations of salts contained in such water.

The reaction is characterized by the fact that the carbonaceous substances, if they are not already black, as for example, wood or lignite, undergo a charring in the course of which they become black or almost black, and that they swell up so that the volume of the treated mass, when, for example, lignite or charcoal is used, is approximately doubled. First of all, however, there is, besides this dehydration and physical modification, also a chemical change which imparts to the substances properties not known heretofore. The chemical change probably is due to the facts that the sulfuric acid not only has an oxidizing action which may be associated with the formation of acid-like, alcohol-like, or ester-like compounds, but also that there is probably, in addition, a substitution reaction which may produce sulfonic acids or sulfonic acid-like compounds of apparently high molecular weight. The oxidizing action of the sulfuric acid is indicated by the formation of sulfurous acid during the reaction, i. e., a reduction of the sulfuric acid and an oxidation of the carbonaceous material. At any rate, the compounds obtained have properties which may be explained in this manner. They have the power to combine with cations, not only from bases or salts which react basic by hydrolysis, but also from salts which contain as anion a strong acid radical such as $SO_4''$, $NO_3'$ or $Cl'$. Accordingly, it is clear that anions of weaker acids such as, for example, acetic and similar organic acids, do not reduce the absorption of the cations. These compounds, when used directly for conditioning water containing salts, take up the cations of the salts and leave the corresponding acids in the water. Thus, an exchange takes place in which the hydrogen ion of the new product is exchanged for the cation of a salt.

The new products are also capable of softening hard water by exchange of metallic cations. For instance, if they have been loaded with sodium ions, an exchange for calcium ions can be obtained by bringing the solution of a calcium salt in contact with the new substances. Then the calcium ions are exchanged for the sodium ions so that a solution of the corresponding sodium salt is formed which solution may, under certain conditions, be free of calcium. In the course of use in practice it was found that water, upon passing through the hydrogen exchange substance, may completely lose its metallic ions so that the effluent is a water which not only is free of hardness but which is entirely and completely free of salts and which merely contains the acids corresponding to the salts dissolved in the water that is, for example, carbonic acid, sulfuric acid, hydrochloric acid. Even these acids can be removed from the water by suitable further treatment, such as heating or precipitation or electrodialysis.

Thus the new substances form salts with the alkali or alkaline earth metals which are insoluble and which resist mineral acids of not too high a concentration.

The substances can again be re-formed when their capacity for absorbing cations is exhausted, by regenerating them with stronger acids which have, for instance, a pH of about 1 or less. After washing these acids out the substances again display their original activity. Similarly, the substances capable of reacting are re-formed in the case of metallic cation exchange, when for instance, sodium ion has been exchanged for calcium ion, by exchanging the calcium ions again by treatment with a solution of a sodium salt. It should be emphasized that this exchange reaction is naturally not limited to alkali salts or alkaline earth salts but that all salts can be exchanged in the same manner, even those of the heavy metals or other light metals.

In producing the new substance, one proceeds, for example, as follows:

50 parts by weight of a commercial lignite having medium moisture content (15% water) are finely crushed and mixed with 200 parts by weight of 93% sulphuric acid. During the mixing the temperature rises to about 70–80° C. The mixture is then further heated, preferably with stirring, until a temperature of approximately 150° C. is reached and sulfurous acid escapes. Because of foaming one must provide a foam stirrer and a rising space. After approximately ¼ hour the heating may be interrupted. The sulphuric acid can be partly separated from the reaction product, for instance by filtration through acid resistant filters, and can be used again. The sulphuric acid is systematically washed out with water.

In this example, the ratio of lignite to sulphuric acid may be changed. The temperature and duration of heating may likewise be changed. With longer heating or heating at higher temperatures more active substances are formed. In particular, one can start with lignite of a definite grain size, for example, 1-2 mm. in order to obtain a reaction product of likewise substantially granular structure.

Starting, for instance, with charcoal, one may proceed as follows:

50 parts by weight of charcoal are brought together with 100-150 parts by weight of 95% sulfuric acid in which connection no heating takes place. Then, one heats until vigorous $SO_2$ formation occurs which takes place without foaming. After 10-15 minutes the heating is interrupted whereupon one proceeds as stated in the first example.

Instead of concentrated sulphuric acid, more dilute acid of for instance 70-80% may be used, or other sulfating agents, such as chlorosulfonic acid, mono-hydrate, fuming sulphuric acid or similarly reacting compounds. With the stronger reacting compounds the duration of reaction and the temperature used in heating can be adjusted for such stronger reaction.

A large increase in volume of the carbonaceous substance takes place.

In the treatment of wood, for instance, in the form of sawdust, at a certain stage of the treatment there occurs an almost complete homogenization so that the mass looks like a black-brown syrup. In the further treatment, for instance by diluting with water, there is again a separation into a non-homogeneous mass which after washing, then likewise has the above characterized property. The individual particles, however, always retain a certain degree of softness.

It has therefore been proved advisable to place the above described homogeneous syrup-like mass either on preferably porous carriers or to let such carriers absorb them. It is advisable to select as carriers such substances which on contact with acids are also resistant or at least sufficiently resistant, as for example, pumice stone, burnt ceramic bodies such as porcelain, stoneware, chamotte, clay, infusorial earth or other substances having a large surface area, such as activated carbon or silica gel.

After the depositing or impregnating, the substances are given a further finishing treatment as described above. In this connection, there is the advantage that the carrier substances can be employed in the desired grain size of for instance 0.5-1 mm. or 1-2 mm., etc.

Instead of the decomposition products of wood, other suitable organic substances can be deposited on or impregnated in such carriers. By way of example, tar or pitch-like substances can be deposited or impregnated and thereafter the acid treatment can be carried out.

Or else, pressed bodies can be made from the finely divided carrier materials such as infusorial earth, or crushed, for instance, pulverized other materials, by using the treated syrup-like wood mass or else the still plastic active wood mass or else other suitable organic substances such as tar or pitch, and these pressed bodies can then be used or further processed.

If, for instance, finely divided substances, as, for example, finely divided lignite or charcoal, amongst others, are used for producing the active mass, then by suitable pressing and forming, for instance in a string press, permeable filter masses can be produced, preferably by the addition of plastic masses, and especially of the plastic active masses described above. There can also be used as minor materials substances which coagulate on contact with water or acid, for example cellulose xanthogenate (viscose) or else gelatinous silicic acid or silica sols. Always materials are obtained which have the above described properties to a greater or lesser extent.

As carrier substances one can also use substances which themselves can be converted into active masses, such as for example charcoal, by permitting them to absorb the syrup-like mass formed for instance by treating wood.

One proceeds, for instance, in such manner that for example, pumice stone or charcoal in grain sizes of 0.5-1-2 mm. is introduced with stirring in such an amount into the syrup-like mass formed by the treatment of wood so that absorption takes place substantially. In this connection further heating may be applied in order to complete the absorption. The mass is then placed in water and washed. The further treatment is carried out as described above. One can also use other carbonaceous waste products.

Finally it has been found that one can also use natural materials impregnated or mixed with carbonaceous substances such as bituminous slate.

The preceding description covers the manufacture of substances which are formed by treatment of carbonaceous materials with sulphuric acid or similarly reacting substances. These and similar substances have the property of retaining the cations from salt solutions in insoluble form, while the anions are left in the filtrate in the form of acids.

If metallic cations have previously been incorporated in the substances, then they are capable of exchanging these cations against the cations of salt solutions with which they come in contact. These properties of the substances can be applied to many uses. They may be used especially for the treatment of water in several respects. The substances exchanging hydrogen ions retain completely the cations of the water so that the effluent water does not contain any cations at all or hardly any and so that merely the anions of the salts having been dissolved in the water are present in the form of acids.

For example, with a water containing 2-3 German degrees sulphate hardness in addition to 7-9 German degrees carbonate hardness equal to 2.1-3.14 grains sulphate hardness and 7.45-9.45 grains carbonate hardness per gallon expressed as $CaCO_3$, one obtains a water completely free of hardness that has a pH of less than 3 and in which the anions present in the water are contained as acids, that is, as sulphuric acid, hydrochloric acid and carbonic acid.

If the active materials have been previously loaded with sodium cations and are then used for the treatment of water, one obtains likewise a water which is free of hardness forming constituents and which now, due to cation exchange, contains the cations previously contained in the substance, for instance sodium salts in place of the hardness forming salts previously present in the water.

In the treatment of the hydrogen ion containing substances with water one can now take the acid containing water and free it completely or nearly completely of the acids by thermal or chemical treatment. The carbonic acid is driven off by the thermal treatment whereas the sulphuric acid ions may be precipitated by a chemical treatment if one adds to the water the calculated quantity of barium salts, i. e., such barium salts, the anion of which is water, such as barium hydroxide, or the anion of which is a readily driven off acid, such as barium carbonate. The filtrate from the precipitates obtained is now almost completely free of acid and also free of salts.

If one wants to produce a water containing merely sulphate one can proceed in such manner that after treatment of the water such amount of alkali is added, for instance in the form of caustic soda or soda ash, that the sulphuric acid is neutralized whereupon, after expelling the carbonic acid, a water is produced containing merely sulphate.

One can, however, also mix the water with a water still containing carbonates and softened either by cation exchange or other methods, and mix the two waters in such ratio that the carbonates of the second water are sufficient to neutralize the sulphuric acid of the first water. By suitable mixing of the waters one has the reduction of the sulphate content under control by merely neutralizing a part of the sulphuric acid and removing the balance by precipitation, or else one can produce a water which still contains certain quantities of carbonates if this is desired. As water softened by cation exchange one can, of course, also use a water which has been obtained by treating the water with the active substances which have been loaded with alkali metal cations.

In case it should be required that the water still contains a certain sulphate hardness one can also proceed in such manner that the free sulphuric acid is neutralized with lime or calcium carbonate whereupon one proceeds as described above in connection with the treatment with barium salts. One then obtains a water which contains calcium sulphate the quantity of which one can likewise vary in accordance with the manner described above. Such water containing sulphate is preferred for brewing purposes.

One can also transform the sulphuric acid into sulphate hardness by passing the water which contains free sulphuric acid and carbonic acid, so quickly over marble that only the sulphuric acid is neutralized by the marble whereas the carbonic acid (which, as known, reacts but slowly with marble) does not react with the marble at all or only to a negligible extent.

One may also proceed to good advantage in such manner that the water is passed at such flow rate through the active substances or that it is left in contact with such substances for so short a period of time that no complete softening of the water takes place, for instance only down to such degree of hardness as corresponds to the sulphate hardness; for instance a water containing three degrees of sulphate hardness would be softened down to three degrees. After boiling off the $CO_2$ one then has a water containing merely calcium sulphate.

In place of marble one may also use other alkaline earth carbonates if one wants other hardness forming constituents in the water especially natural alkaline earth carbonates such as dolomite and magnesite. In place of the natural substances one can also use artificial substances, for example precipitated calcium carbonate or caustic lime or magnesium carbonate or both.

If the calcium sulphate hardness of the water produced in this manner is insufficient for a suitable brewery water, then such calcium sulphate hardness can be increased by dissolving gypsum in the water, for instance by passing the water over the mineral, gypsum, or else one may obtain a water with higher calcium sulphate content by adding amounts of free sulphuric acid corresponding to the desired calcium sulphate hardness and treating such water now containing larger amounts of sulphuric acid in the manner described above.

For example, over 100 parts by volume of the substances, produced as described ante, one passes a water containing 2-3 German degrees calcium sulphate hardness and 7-9 German degrees carbonate hardness equal to 2.1-3.14 grains sulphate hardness and 7.45-9.45 grains carbonate hardness per gallon expressed as $CaCO_3$ at such a flow rate that in one hour 5-10 times the amount of water passes through the filter as compared with the quantity of material used, that is that when for example using one litre of the active material, 5-10 litres of water are passed through per hour. The flow rate at which the water is passed through depends upon the grain size of the material and can be further increased when using finely divided material, whereas with very coarse granular material a reduction in the rate of flow is found desirable. For instance, the quantity of water treated by one litre of the active material amounts to about 100 times the volume of material used. With the above stated composition, the water has a pH of less than 3 and upon a test for dissolved solids is found completely or nearly completely free of salts.

The exhausted material is regenerated by treatment with an acid that forms readily soluble or at least not difficultly soluble salts especially calcium salts, for which reason hydrochloric acid is preferred and may be used in the raw condition. The concentration of the hydrochloric acid should correspond to a pH value of about 1 or less and its concentration must in any case be greater than the pH of the active substance since otherwise, the alkaline earths which have been taken up are not given up again. After treatment with hydrochloric acid and washing the active substance can again be used for further treatment of water as a hydrogen exchange material.

If one is using an active material loaded with alkali ions, such as sodium ions, then a cation exchange takes place in exactly the same manner as with other known cation exchange materials. The working principle is exactly the same as stated in the above described example with the difference that the water obtained contains the alkali salt in quantities corresponding to the alkaline earth salts. In this case regeneration is carried out with an alkali salt solution, for example, sodium chloride or sodium sulphate solution, followed by washing out such solution, whereupon the active material is again capable of further cation exchange. The exchange capacity corresponds to that stated in the above example.

The active material also splits alkali metal salts, that is retains alkali metal ions so that even alkali metal salt solutions may be freed of their cations, and by acid treatment of the active material the removal of the alkali ion or regeneration can be obtained. Similarly other ions of the heavy or light metals can be retained by the active substance by means of which the active substance can then be used for all such treatments as result from the nature of the substances and the salts. In this connection it becomes possible for instance to systematically transform the salt of one acid into salts of another acid, or the salt of one acid into another salt of the same acid. By re-using the new salt solution so obtained, which may even be acid, the salt content of a solution may be steadily increased.

A further possible procedure is to subject the water which still contains sulphate hardness after treatment with the active substances, to a further treatment by cation exchange materials, which likewise may consist of the active substances, for the purpose of complete softening and in order to transform the sulphate hardness into sodium sulphate, if necessary, after having first removed the carbonic acid. This treatment can also be carried out in a filter which for instance, contains in its upper portion active substances treated with acids and in its lower portion active substances containing sodium ions. Such a mass, although not stratified, yet similar in effect, can be obtained by treating or regenerating the active substances with an acid sodium chloride solution.

I claim:

1. A process of making from raw carbonaceous materials containing humic matter substantially water-insoluble sulfated conversion products capable of forming with alkali metal ions water-insoluble ion-exchanging compounds, said process comprising treating a raw carbonaceous material chosen from the class consisting of wood, peat, lignite, charcoal, coals, and cokes, with more than an equal weight of a sulfating reagent selected from the class consisting of concentrated sulfuric acid, chlorosulfonic acid, fuming sulfuric acid, the monohydrate and sulfuric acid anhydride, at a moderate temperature at which said sulfated conversion products are formed without substantial carbonization thereof to form a granular product with a major portion thereof consisting of granules too large to pass through a 50 mesh screen, and washing residual free acid and water-soluble matter from the resulting insoluble sulfated material.

2. Process according to claim 1 wherein a carbonaceous material is subjected to a sulfating treatment with production of a syrupy mass and the mass is impregnated upon a carrier substance to form physically strong and hard granules.

3. A process of making a water insoluble cation-exchange material capable of extracting from water the cations of saline matter dissolved therein and thereby acidifying the water, which comprises heating a member of the coal family with more than an equal weight of a concentrated strong acidic reagent that adds a sulfur containing acidic radical to said member, thereby enhancing the ion-exchange power thereof, to produce a granular product a major portion of which consists of granules larger than 50 mesh in size, and washing the treated material in water to recover said insoluble cation-exchange material.

4. A process of making an acid resistant, water-insoluble granular water softening material comprising treating carbonaceous material selected from the class consisting of wood, peat, lignite, charcoal, coals, and cokes with a concentrated strong acidic reagent that adds a sulfur containing acidic radical to said carbonaceous material at a temperature and under conditions producing oxidation with evolution of $SO_2$ without extensively carbonizing said material, washing said material with water to remove acids and soluble substances, and treating said washed material with an aqueous solution of a sodium salt to charge said material with sodium as the principal exchangeable ion therein.

5. An ion-exchanging, acid resistant, insoluble granular material prepared for use in a pervious bed water conditioner by treating carbonaceous material selected from the class consisting of wood, peat, lignite, charcoal, coals and cokes with more than an equal weight of a concentrated strong acidic reagent that adds a sulfur containing acidic radical to said carbonaceous material, and washing the product with water, said product being capable of withstanding repeated acid regenerations and having a major portion in the form of granules larger than 50 mesh in size.

6. A granular carbonaceous ion-exchange product comprising a member of the coal family treated with a sufficient quantity of a concentrated strong acidic reagent that adds a sulfur containing acidic radical to said member to substantially enhance the ion-exchange capacity thereof, and thereafter charged with sodium as the principal exchangeable ion by subjecting the acid treated coal to contact with a solution of a sodium salt.

7. A granular solid carbonaceous ion exchanging product comprising a carbonaceous material selected from the class consisting of wood, peat, lignite, charcoal, coals and cokes which has been treated with a sufficient quantity of a concentrated strong acidic reagent that adds a sulfur containing acidic radical to substantially improve the ion exchange power thereof, and which has been charged with alkali as the principal exchangeable ion by subjecting the acid treated material to contact with a solution of an alkali metal salt.

8. A granular ion-exchanging material manufactured from lignite by treating said lignite with more than an equal weight of a concentrated strong acidic reagent that adds a sulfur containing acidic radical to the lignite and containing water-insoluble substantially uncarbonized compounds of high molecular weight containing acidic hydrogen, said compounds being capable of removing and fixing the cations of salts of strong acids contained in water by contact therewith, setting free the corresponding acids.

9. A granular ion-exchanging material manufactured from a black coal for use in a pervious bed water conditioner by treating said coal with a concentrated strong acidic reagent that adds a sulfur containing acidic radical to the coal, and containing water-insoluble substantially uncarbonized compounds of high molecular weight containing acidic hydrogen, said compounds being capable of removing and fixing the cations of salts of strong acids contained in water by contact therewith, setting free the corresponding acids, and a major portion of said material consisting of granules too large to pass through a 50 mesh screen.

10. A granular ion exchanging product having a major portion as granules too large to pass through a 50 mesh screen manufactured by treating a member of the coal family with more than an equal weight of a concentrated strong acidic reagent that adds a sulfur containing acidic radical to said member to create or substantially increase the ion exchange capacity thereof, said product containing water insoluble uncarbonized sulfated compounds of high molecular weight containing exchangeable hydrogen and capable of removing and fixing the cations of salts of strong acids dissolved in water, leaving in the water the acids of said salts.

11. A granular ion exchanging product having a major portion as granules too large to pass through a 50 mesh screen manufactured by treating a member of the coal family with a sufficient quantity of a concentrated strong acidic reagent that adds a sulfur containing acidic radical to said member to create or substantially increase the ion exchange capacity thereof and subsequently treating the product with a solution of a sodium salt, said product containing water insoluble uncarbonized sulfated compounds of high molecular weight containing exchangeable sodium as the principal exchangeable ion and capable of removing and fixing the cations of calcium and magnesium salts of strong acids dissolved in water, leaving in the water the sodium salts of said acids.

OTTO LIEBKNECHT.